(12) United States Patent
Deferme

(10) Patent No.: US 11,143,260 B2
(45) Date of Patent: Oct. 12, 2021

(54) DAMPER WITH SINGLE EXTERNAL CONTROL VALVE

(71) Applicant: Tenneco Automotive Operating Company Inc., Lake Forest, IL (US)

(72) Inventor: Stefan Deferme, Heusden-Zolder (BE)

(73) Assignee: Tenneco Automotive Operating Company Inc., Lake Forest, IL (US)

(*) Notice: Subject to any disclaimer, the term of this patent is extended or adjusted under 35 U.S.C. 154(b) by 34 days.

(21) Appl. No.: 16/234,735

(22) Filed: Dec. 28, 2018

(65) Prior Publication Data

US 2020/0208705 A1    Jul. 2, 2020

(51) Int. Cl.
     *F16F 9/06*      (2006.01)
     *F16F 9/18*      (2006.01)
     (Continued)

(52) U.S. Cl.
     CPC .............. *F16F 9/062* (2013.01); *B60G 13/08* (2013.01); *F16F 9/065* (2013.01); *F16F 9/185* (2013.01);
     (Continued)

(58) Field of Classification Search
     CPC .. F16F 9/062; F16F 9/065; F16F 9/081; F16F 9/096; F16F 9/325; F16F 9/46;
     (Continued)

(56) References Cited

U.S. PATENT DOCUMENTS

| | | |
|---|---|---|
| 3,661,236 A | 5/1972 | Wossner |
| 4,802,561 A | 2/1989 | Knecht et al. |

(Continued)

FOREIGN PATENT DOCUMENTS

| | | | |
|---|---|---|---|
| CN | 204083040 U | 1/2015 | |
| DE | 4022099 C1 * | 12/1991 | ............. B60G 15/12 |

(Continued)

OTHER PUBLICATIONS

International Search Report and Written Opinion for PCT/US2019/067464 dated Apr. 21, 2020; 10 pages.

(Continued)

*Primary Examiner* — Thomas J Williams
(74) *Attorney, Agent, or Firm* — Harness, Dickey & Pierce, P.L.C.

(57) ABSTRACT

A damper with inner and outer tubes and a piston slidably disposed within the inner tube to define first and second working chambers. A collector chamber is positioned outside the outer tube. An external control valve is positioned in fluid communication with the collector chamber. An intake valve assembly, mounted to one end of the inner tube, includes an intake valve body, intake passages, and intake valve. The intake valve body abuts the outer tube to define an accumulation chamber positioned between the intake valve assembly and a closed end of the outer tube. The accumulation chamber is arranged in fluid communication with the collector chamber. The intake valve body forms a fluid-tight partition between the accumulation chamber and a fluid transport chamber is positioned between the inner and outer tubes. The intake valve controls fluid flow between the accumulation chamber and the second working chamber through the intake passages.

20 Claims, 13 Drawing Sheets

(51) Int. Cl.
*B60G 13/08* (2006.01)
*B60G 17/08* (2006.01)
*F16F 9/36* (2006.01)
*B60G 17/015* (2006.01)

(52) U.S. Cl.
CPC .......... *F16F 9/366* (2013.01); *B60G 17/0152* (2013.01); *B60G 17/08* (2013.01); *B60G 2202/24* (2013.01); *B60G 2206/41* (2013.01); *B60G 2500/10* (2013.01); *B60G 2800/162* (2013.01); *F16F 2222/12* (2013.01); *F16F 2228/066* (2013.01)

(58) Field of Classification Search
CPC .. F16F 9/461; F16F 2222/12; F16F 2228/066; F16F 9/064; B60G 13/08; B60G 11/30; B60G 17/015; B60G 17/0152; B60G 17/08; B60G 2202/24; B60G 2500/10; B60G 2206/41
USPC ...................................................... 188/266.6
See application file for complete search history.

(56) References Cited

U.S. PATENT DOCUMENTS

| | | | |
|---|---|---|---|
| 4,960,188 A | 10/1990 | Wossner | |
| 5,010,916 A | 4/1991 | Albrecht | |
| 5,163,538 A * | 11/1992 | Derr .................. | F16F 9/46 188/266.6 |
| 5,178,240 A | 1/1993 | Houghton | |
| 5,195,619 A | 3/1993 | Dourson et al. | |
| 5,301,412 A | 4/1994 | Hahn et al. | |
| 5,335,757 A | 8/1994 | Knecht et al. | |
| 5,375,683 A * | 12/1994 | Huang .................. | F16F 9/096 188/266.6 |
| 5,431,259 A | 7/1995 | Mizutani et al. | |
| 5,540,309 A * | 7/1996 | Huang .................. | F16F 9/3235 188/266.6 |
| 5,558,189 A | 9/1996 | Beck | |
| 5,586,627 A | 12/1996 | Nezu et al. | |
| 5,588,510 A | 12/1996 | Wilke | |
| 5,603,392 A | 2/1997 | Beck | |
| 5,607,035 A | 3/1997 | Fulks et al. | |
| 5,620,172 A | 4/1997 | Fulks et al. | |
| 5,649,611 A | 7/1997 | Nakadate | |
| 5,788,030 A | 8/1998 | Rottenberger | |
| 5,860,498 A * | 1/1999 | Pradel .................. | F16F 9/362 188/322.19 |
| 5,901,820 A | 5/1999 | Kashiwagi et al. | |
| 5,934,422 A | 8/1999 | Steed | |
| 6,116,584 A * | 9/2000 | Romer .................. | B60G 13/003 267/34 |
| 6,129,368 A | 10/2000 | Ishikawa | |
| 6,283,259 B1 | 9/2001 | Nakadate | |
| 6,321,888 B1 | 11/2001 | Reybrouck et al. | |
| 6,419,057 B1 * | 7/2002 | Oliver .................. | F16F 9/535 188/267.2 |
| 6,427,986 B1 | 8/2002 | Sakai et al. | |
| 6,494,441 B2 * | 12/2002 | Beck .................. | B60G 17/0416 267/64.16 |
| 6,527,093 B2 | 3/2003 | Oliver et al. | |
| 6,978,871 B2 | 12/2005 | Holiviers | |
| 7,374,028 B2 | 5/2008 | Fox | |
| 7,438,164 B2 | 10/2008 | Groves et al. | |
| 7,950,506 B2 | 5/2011 | Nowaczyk | |
| 8,146,897 B2 * | 4/2012 | Beck .................. | B60G 17/044 188/266.5 |
| 8,157,276 B2 | 4/2012 | Noda et al. | |
| 8,495,947 B2 | 7/2013 | Hata | |
| 8,511,447 B2 | 8/2013 | Nowaczyk et al. | |
| 8,776,961 B2 * | 7/2014 | Mori .................. | B60G 17/08 188/266.2 |
| 8,798,859 B2 | 8/2014 | Uchino et al. | |
| 8,898,899 B2 | 12/2014 | Kim | |
| 8,965,632 B2 | 2/2015 | Uchino et al. | |
| 9,062,737 B2 | 6/2015 | Hoult | |
| 9,067,636 B2 * | 6/2015 | Murakami .......... | B60G 17/044 |
| 9,080,631 B2 | 7/2015 | Hoult | |
| 9,169,888 B2 | 10/2015 | Nishimura et al. | |
| 9,206,876 B2 | 12/2015 | Yamashita et al. | |
| 9,309,948 B2 | 4/2016 | Katayama et al. | |
| 9,347,511 B2 | 5/2016 | Kim | |
| 9,428,030 B2 * | 8/2016 | Teraoka ................ | F16F 9/5126 |
| 9,662,952 B2 * | 5/2017 | Funke ................ | F16F 9/062 |
| 10,473,179 B2 | 11/2019 | Ripa | |
| 10,539,202 B2 * | 1/2020 | Jee .................. | F16F 9/325 |
| 10,570,982 B2 * | 2/2020 | Zhu .................. | F16F 9/3257 |
| 2004/0262107 A1 * | 12/2004 | Nandyal ................ | F16F 9/092 188/314 |
| 2005/0023093 A1 | 2/2005 | Leiphart et al. | |
| 2005/0121268 A1 | 6/2005 | Groves et al. | |
| 2006/0054435 A1 * | 3/2006 | Yamaguchi ............ | F16F 9/065 188/314 |
| 2007/0000743 A1 | 1/2007 | Naitou et al. | |
| 2009/0242339 A1 | 10/2009 | Nakadate et al. | |
| 2010/0065765 A1 * | 3/2010 | Forche .................. | B60G 17/08 251/129.08 |
| 2010/0326780 A1 * | 12/2010 | Murakami ............ | F16F 9/446 188/322.13 |
| 2011/0042174 A1 | 2/2011 | Hamers et al. | |
| 2013/0081913 A1 | 4/2013 | Nowaczyk et al. | |
| 2013/0275003 A1 | 10/2013 | Uchino et al. | |
| 2014/0090938 A1 | 4/2014 | Nishimura | |
| 2014/0231200 A1 | 8/2014 | Katayama | |
| 2014/0291089 A1 | 10/2014 | Konakai et al. | |
| 2015/0047937 A1 | 2/2015 | Kim | |
| 2015/0191069 A1 | 7/2015 | Zuleger et al. | |
| 2016/0160955 A1 | 6/2016 | Yu et al. | |
| 2016/0214453 A1 | 7/2016 | Tanahashi et al. | |
| 2016/0229254 A1 * | 8/2016 | Teraoka ................ | F16F 9/50 |
| 2016/0230832 A1 * | 8/2016 | Hagidaira .......... | F15B 13/0433 |
| 2016/0281815 A1 | 9/2016 | Teraoka et al. | |
| 2017/0284497 A1 | 10/2017 | Uotani et al. | |
| 2017/0334503 A1 | 11/2017 | Sintorn et al. | |
| 2018/0031071 A1 | 2/2018 | Marking | |
| 2018/0135720 A1 | 5/2018 | De Kock | |
| 2018/0266510 A1 | 9/2018 | Jee | |
| 2018/0320751 A1 | 11/2018 | Kadokura et al. | |
| 2018/0355939 A1 * | 12/2018 | Zeissner ................ | F16F 9/325 |
| 2019/0136932 A1 * | 5/2019 | Deferme .............. | B60G 13/008 |
| 2019/0309816 A1 | 10/2019 | Shidata et al. | |
| 2020/0124129 A1 | 4/2020 | Mohammadi | |
| 2020/0208704 A1 | 7/2020 | Deferme | |
| 2020/0208705 A1 | 7/2020 | Deferme | |
| 2021/0003190 A1 | 1/2021 | Deferme | |

FOREIGN PATENT DOCUMENTS

| | | | |
|---|---|---|---|
| DE | 19527849 C1 | 8/1996 | |
| DE | 4423515 C2 | 7/1998 | |
| DE | 4324444 C2 | 11/2000 | |
| DE | 10355151 A1 | 6/2005 | |
| DE | 102006014463 A1 * | 8/2007 | ............. B60G 17/08 |
| DE | 102010020057 A1 * | 1/2011 | ............. F16F 9/062 |
| DE | 102015209179 A1 | 11/2016 | |
| DE | 102015224811 A1 | 6/2017 | |
| DE | 102016206595 A1 | 10/2017 | |
| EP | 0635655 A1 | 1/1995 | |
| EP | 1508723 A2 | 2/2005 | |
| EP | 1862337 B1 | 8/2012 | |
| GB | 2262971 A * | 7/1993 | ............. F16F 9/096 |
| JP | 2010-107040 A | 5/2010 | |
| JP | 2014-070703 A | 4/2014 | |
| JP | 2017146277 A | 8/2017 | |
| KR | 101756423 B1 | 7/2017 | |
| KR | 10-2018-0106202 A | 10/2018 | |
| WO | WO-2017182198 A1 | 10/2017 | |

OTHER PUBLICATIONS

International Search Report and Written Opinion for PCT/US2019/067439 dated Apr. 27, 2020; 6 pages.

(56) References Cited

OTHER PUBLICATIONS

International Search Report regarding PCT/US2020/039794, dated Oct. 8, 2020.
Written Opinion regarding PCT/US2020/039794, dated Oct. 8, 2020.
International Search Report regarding PCT/US2020/041887, dated Oct. 30, 2020.
Written Opinion regarding PCT/US2020/041887, dated Oct. 30, 2020.

* cited by examiner

DAMPER WITH SINGLE EXTERNAL CONTROL VALVE

FIELD

The present disclosure generally relates to dampers. More particularly, the present disclosure relates to a damper with a single externally mounted control valve.

BACKGROUND

This section provides background information related to the present disclosure which is not necessarily prior art Vehicles generally include dampers that are used in conjunction with suspension systems to absorb vibrations that occur while driving the vehicle. In order to absorb the vibrations, dampers are generally connected between a body and the suspension system of the vehicle. A piston is located within the damper. The piston is connected to the vehicle body or the suspension of the vehicle through a piston rod. The damper also includes a damper body that is connected to the suspension system. As the damper is compressed or extended, the piston may limit the flow of damping fluid between first and second working chambers that are defined within the damper body in order to produce a damping force that counteracts the vibrations. By further restricting the flow of damping fluid between the first and second working chambers of the damper, greater damping forces may be generated by the damper.

Dampers typically include one or more valves that control flow of fluid during extension and compression motions of the piston. Current damper designs include a valve block that provides mutual hydraulic connections between the first and second working chambers, the valves, and an accumulator. Such designs often make the damper bulky and increase the overall cost of the damper. Current dampers also have check values that further increase the size and cost of the damper.

SUMMARY

This section provides a general summary of the disclosure, and is not a comprehensive disclosure of its full scope or all of its features.

In accordance with one aspect of the present disclosure, a damper is provided. The damper includes an inner tube that extends longitudinally between first and second inner tube ends. The damper includes a piston slidably disposed within the inner tube. The piston defines a first working chamber and a second working chamber within the inner tube. The first working chamber is longitudinally positioned between the piston and the first inner tube end and the second working chamber is longitudinally positioned between the piston and the second inner tube end. The damper also includes an outer tube disposed around the inner tube. The outer tube extends longitudinally between first and second outer tube ends. The first working chamber is arranged in fluid communication with a fluid transport chamber that is disposed radially between the inner tube and the outer tube. The damper further includes a collector chamber that is positioned outside of the outer tube. The damper includes a single control valve mounted on the outer tube. An inlet of the single control valve is arranged in fluid communication with the fluid transport chamber and an outlet of the single control valve is arranged in fluid communication with the collector chamber.

An intake valve assembly is mounted to the second inner tube end. The intake valve assembly includes an intake valve body, one or more intake passages, and an intake valve. The intake valve body abuts the outer tube to define an accumulation chamber that is longitudinally positioned between the intake valve assembly and the second outer tube end. The accumulation chamber is arranged in fluid communication with the collector chamber. The intake valve body forms a fluid-tight partition between the accumulation chamber and the fluid transport chamber. The intake passage(s) extend through the intake valve body. The intake valve is operable to control fluid flow between the accumulation chamber and the second working chamber through the intake passage(s). Because the intake valve is integrated into the fluid-tight partition between the accumulation chamber and the fluid transport chamber instead of in the single control valve, the externally mounted single control valve can be made smaller. Advantageously, this results in an improvement to the packaging dimensions of the damper.

The damper design disclosed herein applies to both mono-tube and dual-tube damper arrangements. In the mono-tube arrangement, the damper includes a floating piston that is slidably disposed in the outer tube between the intake valve assembly and the second end of the outer tube. In accordance with this arrangement, the accumulation chamber is positioned longitudinally between the intake valve assembly and the floating piston. A pressurized chamber is positioned longitudinally between the floating piston and the second end of the outer tube. The pressurized chamber contains a pressurized fluid, which operates to bias the floating piston towards the intake valve assembly.

In the dual-tube arrangement, the damper includes an intermediate tube that is disposed radially between the inner tube and the outer tube. The intermediate tube extends longitudinally between a first intermediate tube end that abuts an outside cylindrical surface of the first end of the inner tube and a second intermediate tube end that abuts an inside cylindrical surface of the outer tube. As a result, a reserve chamber is defined between the intermediate tube and the outer tube and the fluid transport chamber is defined between the intermediate tube and the inner tube.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
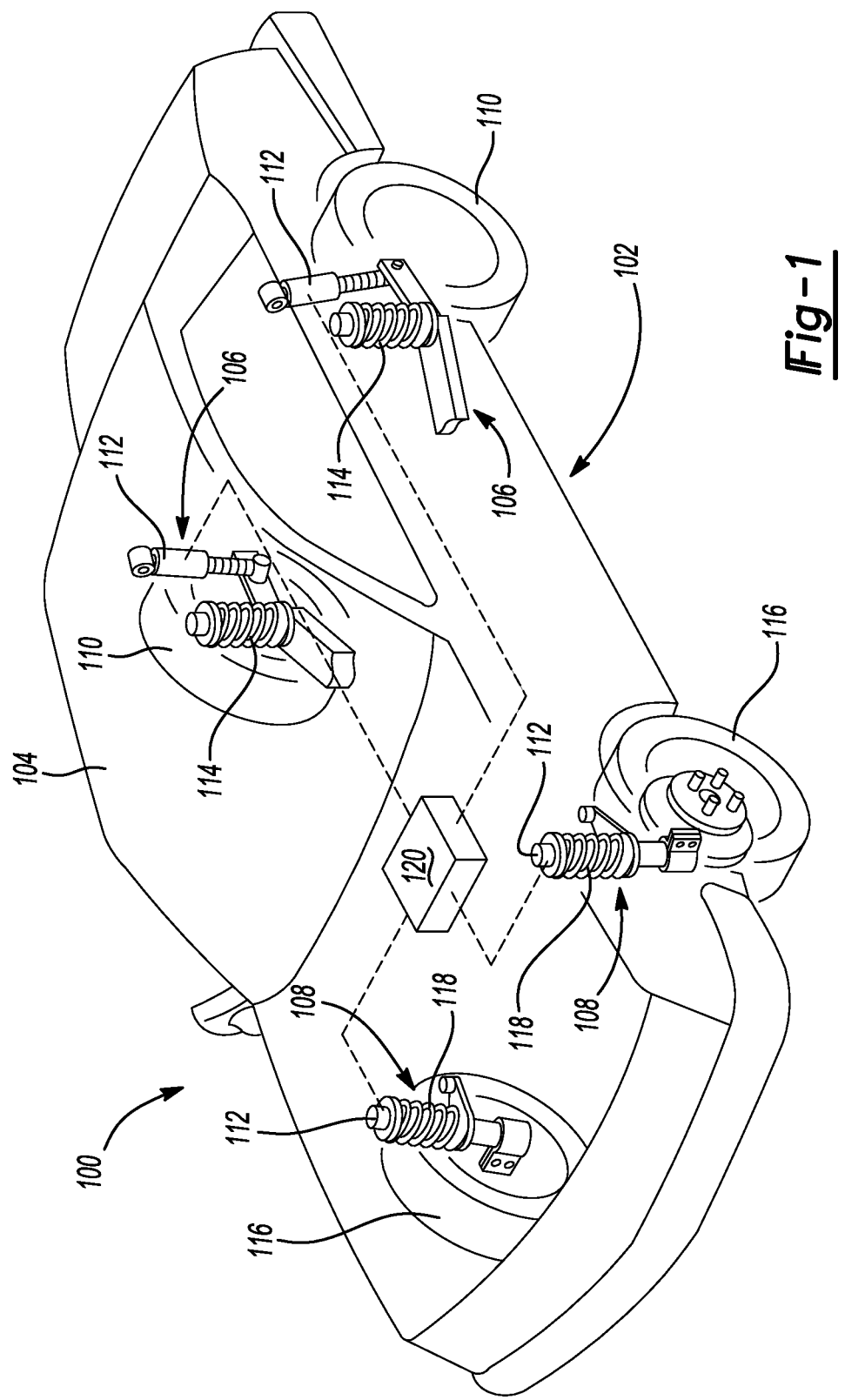
FIG. 1 is an illustration of a vehicle incorporating a suspension system constructed in accordance with the present disclosure.

Example embodiments will now be described more fully with reference to the accompanying drawings. Wherever possible, the same reference numbers will be used throughout the drawings to refer to same or like parts.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates an exemplary vehicle 100 incorporating a suspension system 102 in accordance with the present disclosure. The vehicle 100 may be driven by an internal combustion engine, an electric motor, a hybrid/electric powertrain, or equivalents thereof. The vehicle 100 includes a body 104. The suspension system 102 of the vehicle 100 includes a rear suspension 106 and a front suspension 108. The rear suspension 106 includes a transversely extending rear axle assembly (not shown) adapted to operatively support a pair of rear wheels 110. The rear axle assembly is operatively connected to the body 104 by means of a pair of dampers 112 and a pair of helical coil springs 114. Similarly, the front suspension 108 includes a transversely extending front axle assembly (not shown) that supports a pair of front wheels 116. The front axle assembly is connected to the body 104 by means of another pair of the dampers 112 and a pair of helical coil springs 118. In an alternative embodiment, the vehicle 100 may include an independent suspension unit (not shown) for each of the four corners instead of front and rear axle assemblies.

The dampers 112 of the suspension system 102 serve to dampen the relative movement of the unsprung portion (i.e., the front and rear suspensions 108, 106 and the front and rear wheels 116, 110) and the sprung portion (i.e., the body 104) of the vehicle 100. While the vehicle 100 has been depicted as a passenger car, the dampers 112 may be used with other types of vehicles. Examples of such vehicles include buses, trucks, off-road vehicles, three-wheelers, ATVs, motor bikes, and so forth. Furthermore, the term "damper" as used herein will refer to dampers in general and will include shock absorbers, McPherson struts, and semi-active and active suspensions.

In order to automatically adjust each of the dampers 112, an electronic controller 120 is electrically connected to the dampers 112. The electronic controller 120 is used for controlling the operation of each of the dampers 112 in order to provide appropriate damping characteristics resulting from movements of the body 104 of the vehicle 100. The electronic controller 120 may independently control each of the dampers 112 in order to independently control a damping level of each of the dampers 112. The electronic controller 120 may be electrically connected to the dampers 112 via wired connections, wireless connections, or a combination thereof.

The electronic controller 120 may independently adjust the damping level, damping rate, or damping characteristics of each of the dampers 112 to optimize the ride performance of the vehicle 100. The term "damping level", as used herein, refers to a damping force produced by each of the dampers 112 to counteract movements or vibrations of the body 104. A higher damping level may correspond to a higher damping force. Similarly, a lower damping level may correspond to a lower damping force. Adjustment of the damping levels is beneficial during braking and turning of the vehicle 100 to counteract brake dive, during braking, and body roll during turns. In accordance with one embodiment of the present disclosure, the electronic controller 120 processes input signals from one or more sensors (not shown) of the vehicle 100 in order to control the damping level of each of the dampers 112. The sensors may sense one or more parameters of the vehicle 100, such as, but not limited to, displacement, velocity, acceleration, vehicle speed, steering wheel angle, brake pressure, engine torque, engine revolutions per minute (RPM), throttle pedal position, and so forth. The electronic controller 120 may further control the damping level of the dampers 112 based on a driving mode of the vehicle 100. The driving mode may include a sport mode and a comfort mode. A button (not shown) may allow a driver of the vehicle 100 to choose the driving mode of the vehicle 100. The electronic controller 120 may receive input signals based on an actuation of the button and control the dampers 112 accordingly.

In accordance with another embodiment of the present disclosure, the electronic controller 120 controls the damping level of each of the dampers 112 based on external road conditions, such as rain, snow, mud, and the like. In a further embodiment, the electronic controller 120 regulates the damping level of each of the dampers 112 based on internal vehicle conditions, such as a fuel level, occupancy of the vehicle, load, and so forth.

While the present disclosure is being illustrated with a single electronic controller 120, it is within the scope of the present disclosure to utilize a dedicated electronic controller for each of the dampers 112. The dedicated electronic controller may be located onboard each respective damper 112. Alternatively, the electronic controller 120 may be integrated into an Electronic Control Unit (ECU) of the vehicle 100. The electronic controller 120 may include a processor, memory, Input/Output (I/O) interfaces, communication interfaces, and other electrical components. The processor may execute various instructions stored in the memory for carrying out various operations of the electronic controller 120. The electronic controller 120 may receive and transmit signals and data through the I/O interfaces and the communication interfaces. In further embodiments, the electronic controller 120 may include microcontrollers, application-specific integrated circuits (ASICs), field programmable gate arrays (FPGAs), and so forth.

Figure 2:
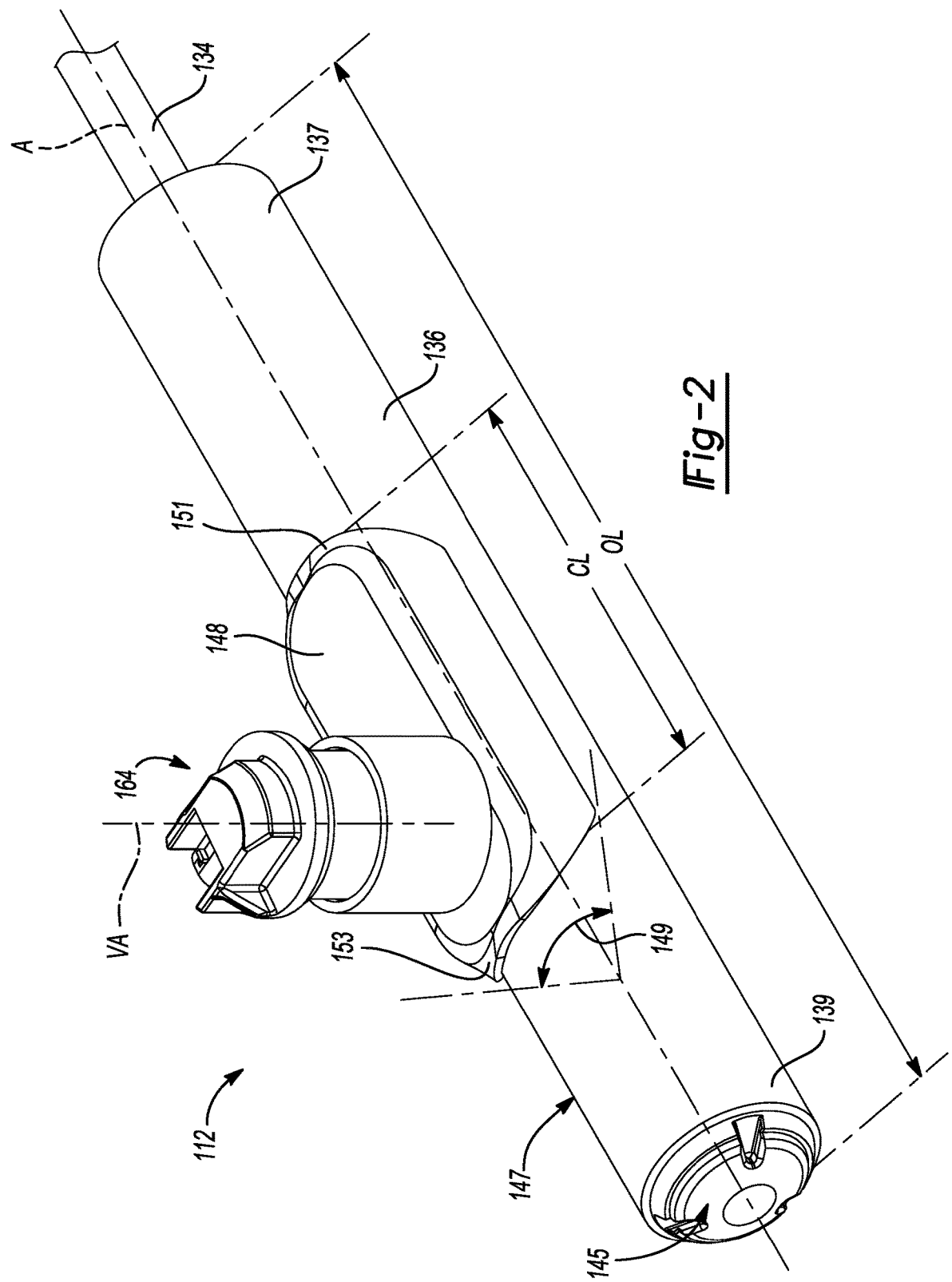
FIG. 2 is a front perspective view of an exemplary mono-tube damper constructed in accordance with the present disclosure.
Figure 3:
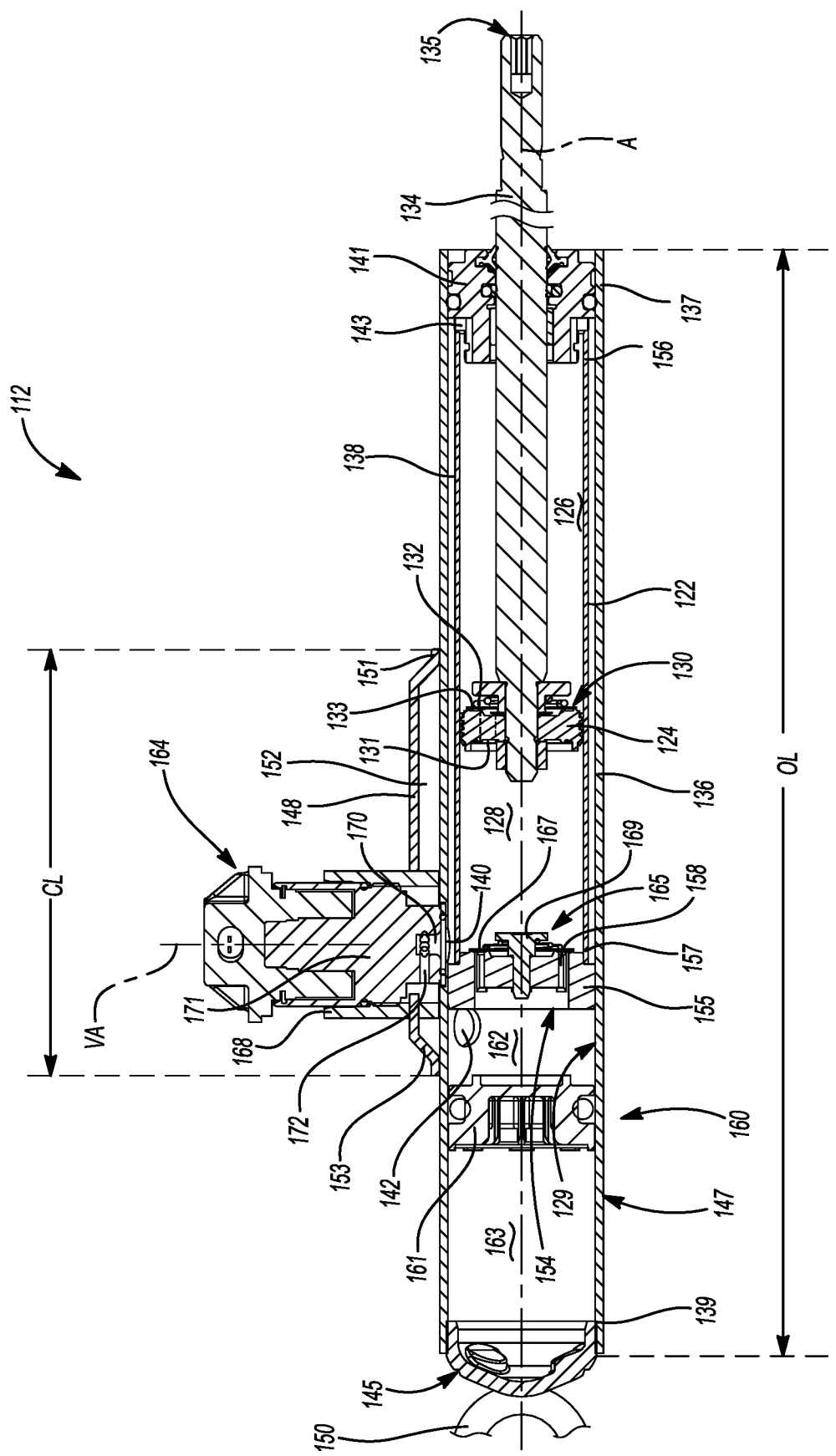
FIG. 3 is a side cross-sectional view of the exemplary damper shown in FIG. 2.

FIGS. 2 and 3 illustrate an exemplary damper 112, which has a mono-tube arrangement. The damper 112 may be any of the four dampers 112 of the vehicle 100. The damper 112 may optionally be configured as a Continuously Variable Semi-Active Suspension system damper 112. The damper 112 contains a fluid. By way of example and without limitation, the fluid is hydraulic fluid or oil. The damper 112 includes an inner tube 122 that extends longitudinally between a first inner tube end 156 and a second inner tube end 157. A piston 124 is slidably disposed within the inner tube 122. The piston 124 defines a first working chamber 126 and a second working chamber 128 within the inner tube 122. Each of the first and second working chambers 126, 128 contain the fluid therein. The first working chamber 126 is positioned longitudinally between the piston 124 and the first inner tube end 156 and acts as a rebound chamber during movement of the piston 124. The second working chamber 128 is positioned longitudinally between the piston 124 and the second inner tube end 157 and acts as a compression chamber. The volume of the first and second working chambers 126, 128 varies based on the movement of the piston 124.

Figure 4:
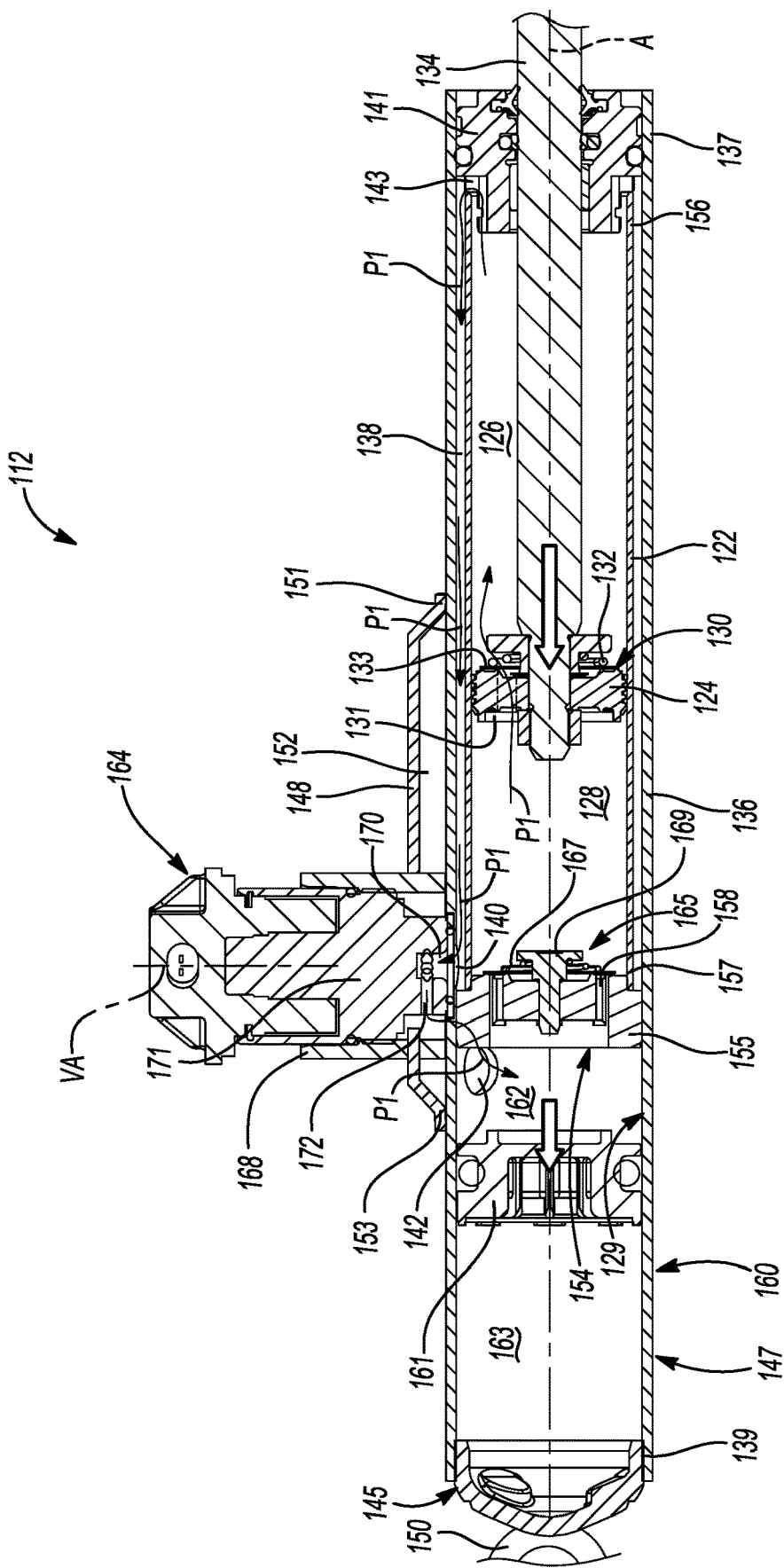
FIG. 4 is an enlarged side cross-sectional view of the exemplary damper shown in FIG. 3, where arrows are included illustrating the fluid flow path through the damper during a compression stroke.

A single piston valve assembly 130 is disposed within the piston 124 to regulate fluid flow between the first working chamber 126 and the second working chamber 128. The piston valve assembly 130 includes one or more compression passages 131 and a compression valve 132. The compression valve 132 includes one or more flex discs 133 that flex towards and away from the piston 124 to close and open the compression passages 131 in the piston 124. As shown in FIG. 4, the piston valve assembly 130 is configured to act as a one-way valve that permits fluid flow through the compression passages 131 from the second working chamber 128 to the first working chamber 126 in response to movement of the piston toward the second inner tube end 157.

The damper 112 includes a piston rod 134. The piston rod 134 is coaxially aligned with and defines a longitudinal axis A. One end of the piston rod 134 is connected to the piston 124 and reciprocates with the piston 124 whereas an opposite end of the piston rod 134 includes an attachment interface 135 that is configured to be connected to a component of the suspension system 102 or the body 104 of the vehicle 100.

The damper 112 also includes an outer tube 136 disposed annularly around the inner tube 122 and includes an inner cylindrical surface 129 that faces and is spaced from the inner tube 122. In some embodiments, the outer tube 136 is concentrically disposed around the inner tube 122. The outer tube 136 extends longitudinally between a first outer tube end 137 and a second outer tube end 139. The piston rod 134 extends longitudinally out through the first outer tube end 137. The outer tube 136 includes a closed portion 145 at the second outer tube end 139 and a cylindrical portion 147 that extends from the first outer tube end 137 to the closed portion 145 at the second outer tube end 139. Optionally, an attachment fitting 150 is mounted to the closed portion 145 of the outer tube 136. The attachment fitting 150 is provided in the form of a hole, loop, threaded stud, or other attachment structure and is configured to attach to a component of the suspension system 102 or the body 104 of the vehicle 100.

The damper 112 further includes a fluid transport chamber 138 that is disposed between the inner tube 122 and the outer tube 136. The piston rod 134 extends longitudinally through a rod guide 141, which is housed inside the first outer tube end 137. In the illustrated embodiment, the entire rod guide 141 is received within the first outer tube end 137 while only a portion of the rod guide 141 is received within the first inner tube end 156. The rod guide 141 includes a rod guide passage 143 that is arranged in fluid communication with and that extends between the first working chamber 126 and the fluid transport chamber 138. Stated another way, the fluid transport chamber 138 is arranged in fluid communication with the first working chamber 126 via the rod guide passage 143.

Further, the damper 112 includes a cover member 148 attached to the outer tube 136. A collector chamber 152 is defined between the cover member 148 and the outer tube 136. The collector chamber 152 is positioned external to (i.e., radially outward of) the outer tube 136. The collector chamber 152 is arranged in fluid communication with the fluid transport chamber 138 via a first opening 140 in the outer tube 136.

In the illustrated example, the collector chamber 152 has a limited circumferential extent that extends about the outer tube in an arc 149 that is less than or equal to 180 degrees. In other words, the collector chamber 152 in the illustrated example is a pocket that runs along one side of the outer tube 136 and is therefore distinguishable from an annular chamber, such as an annular chamber created by another tube disposed about the outer tube 136. The outer tube 136 has an outer tube length OL that is measured longitudinally between the first and second outer tube ends 137, 139 and the collector chamber 152 has a collector chamber length CL that is measured longitudinally between first and second collector ends 151, 153. The collector chamber length CL is shorter than the outer tube length OL. In other words, the collector chamber 152 is shorter than the outer tube 136 and does not run along the entire length of the outer tube 136.

The damper 112 also includes an intake valve assembly 154 mounted to the second inner tube end 157. The intake valve assembly 154 is disposed inside the outer tube 136 and abuts the second inner tube end 157. The intake valve assembly 154 includes an intake valve body 155 that abuts the inner cylindrical surface 129 of the outer tube 136 to define an accumulation chamber 162 disposed between the intake valve assembly 154 and the second outer tube end 139. The intake valve body 155 forms a fluid-tight partition between the accumulation chamber 162 and the fluid transport chamber 138. Optionally, the intake valve body 155 can be welded, crimped, or glued to the outer tube 136.

Figure 6:
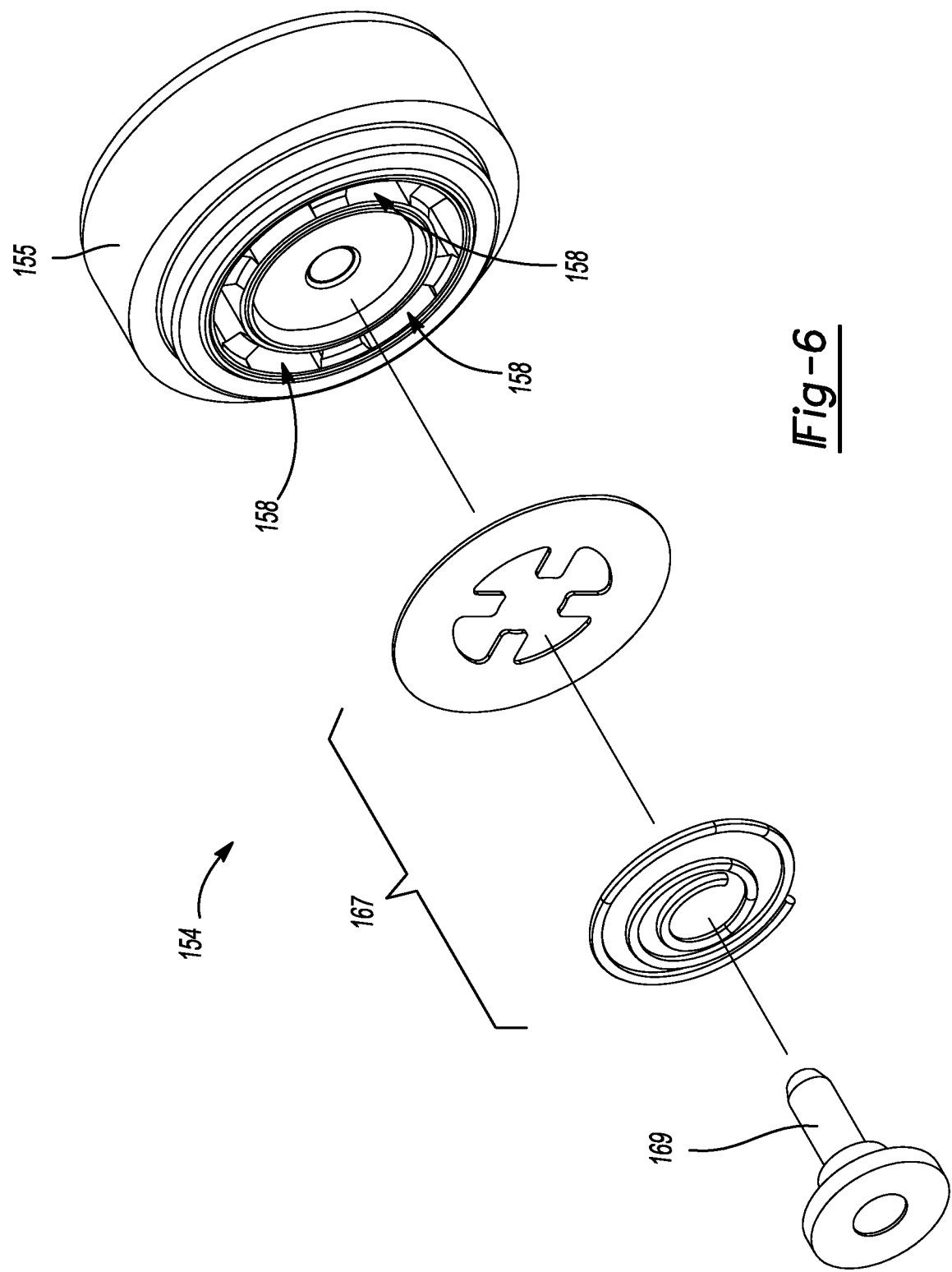
FIG. 6 is a front exploded perspective view of an exemplary intake valve assembly of the exemplary damper shown in FIG. 3.
Figure 7:
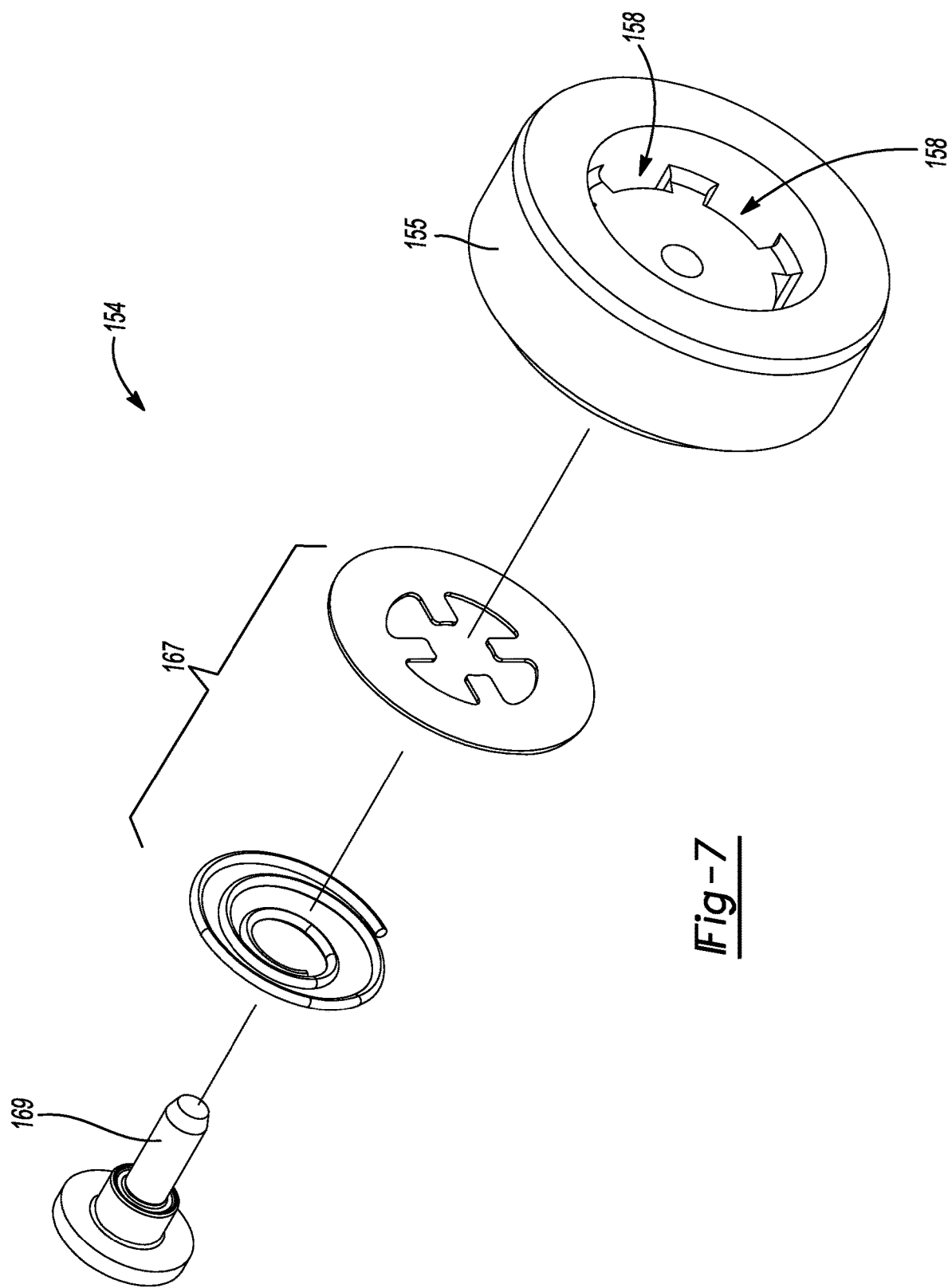
FIG. 7 is a back exploded perspective view of an exemplary intake valve assembly of the exemplary damper shown in FIG. 3.

The accumulation chamber 162 is arranged in fluid communication with the collector chamber 152. With additional reference to FIGS. 6 and 7, the intake valve assembly 154 includes one or more intake passages 158 that extend through the intake valve body 155. The intake passages 158 allow fluid communication between the accumulation chamber 162 and the second working chamber 128. The intake valve assembly 154 further comprises an intake valve 165 that controls fluid flow through the intake passages 158 between the accumulation chamber 162 and the second working chamber 128. In the illustrated example, the intake valve assembly 154 is a passive valve. More specifically, the intake valve 165 may include a single spring disc or a spring disc stack 167, disposed in the second working chamber 128, that is mounted to the intake valve body 155 by a retainer 169. In operation, the spring disc stack 167 opens and closes the intake passages 158 by flexing towards and away from the intake valve body 155 based on a pressure differential between the accumulation chamber 162 and the second working chamber 128. The intake valve assembly 154 acts as a one-way valve that permits fluid flow in only one direction from the accumulation chamber 162 to the second working chamber 128. As will be explained in greater detail below, this one-way flow through the intake valve assembly 154 occurs during extension strokes, which is where the piston 124 moves away from the intake valve assembly 154.

The intake valve assembly 154 may optionally include bleed passages (not shown) that are separate from the intake passages 158. The bleed passages can be provided in a slotted disc (not shown) or as grooves or passages in the intake valve body 155. The bleed passages can be tuned to limit fluid flow through the intake valve assembly 154 during compression and extension strokes of the damper 112. Alternatively or in addition to the bleed passages, the intake valve assembly 154 may include bleed discs or passive valves to limit the pressure differential across the intake valve assembly 154.

In accordance with the illustrated embodiment, the damper 112 includes an accumulator 160. In the illustrated example of FIG. 2, the accumulator 160 is a piston accumulator. Alternatively, the accumulator 160 may include a bladder accumulator. In the illustrated example, the accumulator 160 is disposed within the second outer tube end 139. The accumulator 160 defines an accumulator chamber 162 containing the fluid therein. Further, the accumulator 160 includes a floating piston 161 and a pressurized chamber (e.g., a gas chamber) 163. The pressurized chamber 163 is sealably separated from the accumulation chamber 162 by the floating piston 161. The floating piston 161 is slidably disposed in the outer tube 136 between the intake valve assembly 154 and the second outer tube end 139. Therefore, the accumulation chamber 162 is positioned longitudinally between the intake valve assembly 154 and the floating piston 161. The pressurized chamber 163 is positioned longitudinally between the floating piston 161 and the second outer tube end 139. The pressurized chamber 163 contains a pressurized fluid, such as a gas, that operates to bias the floating piston 161 towards the intake valve assembly 154. In an alternative embodiment, the accumulator 160 may be located external to the outer tube 136 of the damper 112. Such configurations can be used to provide packaging flexibility. For example, the use of an externally mounted accumulator 160 can reduce the overall length of the damper 112.

The damper 112 includes a single control valve 164 that is externally mounted to the outer tube 136. In the illustrated example, the single control valve 164 is a two-position, solenoid actuated electro-hydraulic valve. However, it should be appreciated that other types of active (e.g., electric) or passive (e.g., mechanical) externally mounted valves can be used. As will be explained in greater detail below, the single control valve 164 is operable to regulate fluid flow from the fluid transport chamber 138 to the collector chamber 152. The single control valve 264 includes a valve member 171 that is moveable along a control valve axis VA between an open position and a closed position. Although other configurations are possible, in the illustrated embodiment, wherein the control valve axis VA is perpendicular to the longitudinal axis A of the piston rod 134.

The controller 120 may regulate the single control valve 164 in order to control the damping level of the damper 112. The single control valve 164 may be controlled by an input current provided to the solenoid of the single control valve 164. The controller 120 generates the input current in order to control the operation and the damping level of the damper 112. The solenoid of the single control valve 164 may be connected in electrical communication with the controller 120. Further, the input current may vary between lower and upper limits, which correspond to least and most restrictive positions (i.e., an open position and a closed position) of the single control valve 164. The controller 120 may control the damping force or level by controlling a degree of restriction of the single control valve 164. Specifically, the controller 120 may regulate the input currents to vary a restriction of the single control valve 164. Sending a low current to the single control valve 164 may correspond to low damping ratio or damping level. Similarly, sending a high current to the single control valve 164 may correspond to a high damping ratio or damping level.

The single control valve 164 has a control valve inlet 170 that is arranged in fluid communication with the fluid transport chamber 138 between the inner and outer tubes 122, 136 and a control valve outlet 172 that is arranged in fluid communication with the collector chamber 152. The first opening 140 in the outer tube 136 is arranged in fluid communication with and that extends between the fluid transport chamber 138 and the control valve inlet 170. The outer tube also includes a second opening 142 that is arranged in fluid communication with and that extends between the collector chamber 152 and the accumulation chamber 162. As a result, the accumulator chamber 162 is arranged in fluid communication with the collector chamber 152 via the second opening 142 in the outer tube 136.

During an extension (i.e., rebound) stroke of the damper 112, the single control valve 164 is operable to regulate fluid flow from the fluid transport chamber 138 to the collector chamber 152 in response to movement of the piston 124 towards the rod guide 141. The single control valve 164 is in the open position during extension strokes of the damper 112 to control rebound damping characteristics of the damper 112. Specifically, the degree of opening of the single control valve 164 may be regulated to adjust the extension/rebound damping characteristics of the damper 112. During a compression stroke, the single control valve 164 also allows fluid flow through the collector chamber 152 and into the accumulation chamber 162 in response to movement of the piston 124 towards the intake valve assembly 154. Thus, the single control valve 164 is also in the open position during compression strokes of the damper 112.

In the illustrated example, a portion of control valve housing 168 is received within and extends through the cover member 148. Though the first opening 140 in the outer tube 136 is illustrated as a circular aperture in FIG. 2, the shape and dimensions of the first opening 140 in the outer tube 136 may be based on any shape and dimensions of the control valve housing 168. In the open position, the single control valve 164 allows fluid communication between the fluid transport chamber 138 and the collector chamber 152. More particularly, the control valve inlet 170 is in fluid communication with the fluid transport chamber 138 and the control valve outlet 172 is in fluid communication with the collector chamber 152. The valve member 171 allows selective fluid communication between the control valve inlet 170 and the control valve outlet 172 and therefore between the fluid transport chamber 138 and the collector chamber 152, which ultimately regulates fluid flow from the first working chamber 126 to the accumulation chamber 162.

As explained above, the intake valve assembly 154 allows unidirectional flow of fluid from the accumulation chamber 162 to the second working chamber 128. The intake valve assembly 154 is in an open position during extension strokes of the damper 112 and in a closed position during compression strokes. During compression strokes, the volume of the first working chamber 126 increases as the piston 124 moves towards the second working chamber 128. The compression valve 132 in the piston 124 provides a compensating fluid flow from the second working chamber 128 to the first working chamber 126 via the compression passages 131 to increase the amount of fluid in the first working chamber 126. As the piston 124 continues to move towards the intake valve assembly 154, the volume of the first working chamber 126 that is occupied by the piston rod 134 increases. In response to the increase in rod volume, a compensating fluid flow occurs from the first working chamber 126 to the fluid transport chamber 138 and ultimately the accumulation chamber 162.

Operation of the damper 112 during the rebound and compression strokes will now be explained in greater detail.

With reference to FIG. 4, the damper 112 is shown in a compression stroke, which occurs when the piston 124 moves towards the intake valve assembly 154. During a compression stroke, the volume of the fluid in the first working chamber 126 that is displaced by the piston rod 134 increases and the volume of the second working chamber 128 decreases. An additional flow of fluid must be supplied to the first working chamber 126 to compensate for the increase in the volume of the first working chamber 126. Further, during the compression stroke, there is a net flow of fluid into the accumulation chamber 162, which causes the floating piston 161 to move away from the intake valve assembly 154, increasing the size of the accumulation chamber 162. This net flow of fluid into the accumulation chamber 162 occurs due to the increase in the volume of the piston rod 134 in the first working chamber 126.

During a compression stroke, the single control valve 164 is in an open position and the piston 124 moves towards the intake valve assembly 154. A compression flow path P1 is defined inside the damper 112, where fluid in the second working chamber 128 flows through the compression passages 131 in the piston valve assembly 130 to the first working chamber 126. The fluid displaced by the increasing rod volume in the first working chamber 126 then flows to the fluid transport chamber 138 via the rod guide passages 143. Fluid in the fluid transport chamber 138 flows to the inlet 170 of the single control valve 164 and passes through the first opening 140 in the outer tube 136. Fluid from the inlet 170 of the single control valve 164 flows to the outlet 172 of the single control valve 164 because the single control valve 164 is in the open position and fluid from the outlet 172 of the single control valve 164 flows to the collector chamber 152. Finally, fluid from the collector chamber 152 flows into the accumulation chamber 162 via the second opening 142 in the outer tube 136.

Figure 5:
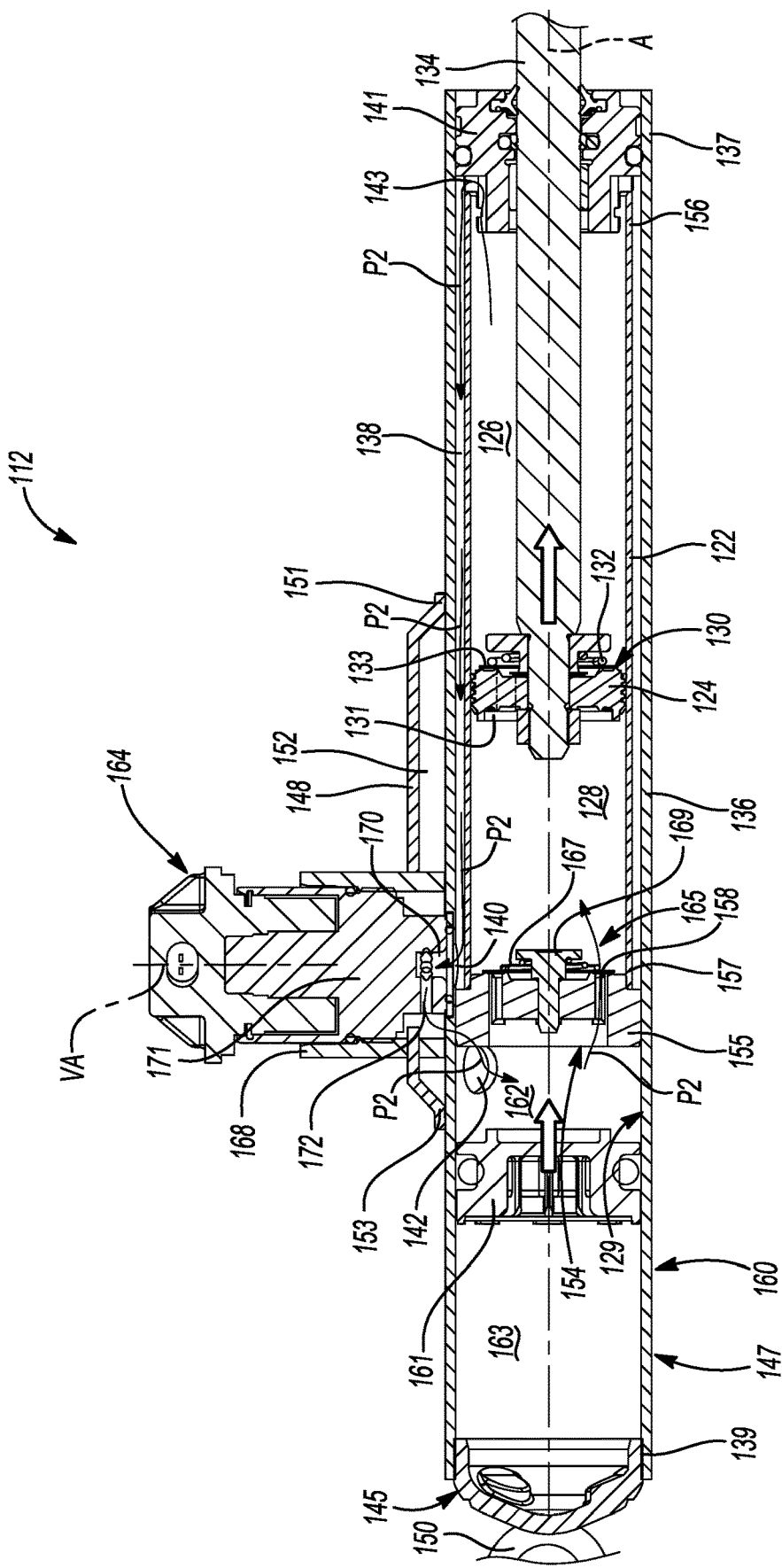
FIG. 5 is another enlarged side cross-sectional view of the exemplary damper shown in FIG. 3, where arrows are included illustrating the fluid flow path through the damper during an extension stroke.

With reference to FIG. 5, the damper 112 is shown in an extension/rebound stroke, which occurs when the piston 124 moves away from the intake valve assembly 154. During the extension/rebound stroke, the volume of the fluid in the first working chamber 126 that is displaced by the piston rod 134 decreases and the volume of fluid in the second working chamber 128 increases. An additional flow of fluid must be supplied to the second working chamber 128 to compensate for the increase in the volume of the second working chamber 128. In order to increase the amount of fluid in the second working chamber 128, some portion of the fluid from the accumulation chamber 162 flows through the intake valve assembly 154 and into the second working chamber 128 such that an extension flow path P2 is defined within the damper 112. Further, during the extension/rebound stroke, there is a net flow of fluid out of the accumulation chamber 162, which causes the floating piston 161 to move towards the intake valve assembly 154, decreasing the size of the accumulation chamber 162. This net flow of fluid out of the accumulation chamber 162 occurs due to the decrease in the volume of the piston rod 134 in the first working chamber 126.

During an extension/rebound stroke, the single control valve 164 is in an open position and the piston 124 moves away from the intake valve assembly 154. Fluid in the first working chamber 126 flows into the fluid transport chamber 138 via the rod guide passages 143. Fluid in the fluid transport chamber 138 then flows to the inlet 170 of the single control valve 164 and passes through the first opening 140 in the outer tube 136. Fluid from the inlet 170 of the single control valve 164 flows to the outlet 172 of the single control valve 164 because the single control valve 164 is in the open position and fluid from the outlet 172 of the single control valve 164 flows into the collector chamber 152. Fluid from the collector chamber 152 flows into the accumulation chamber 162 via the second opening 142 in the outer tube 136. Finally, fluid in the accumulation chamber 162 flows through the intake passages 158 of the intake valve assembly 154 and into the second working chamber 128.

Figure 8:
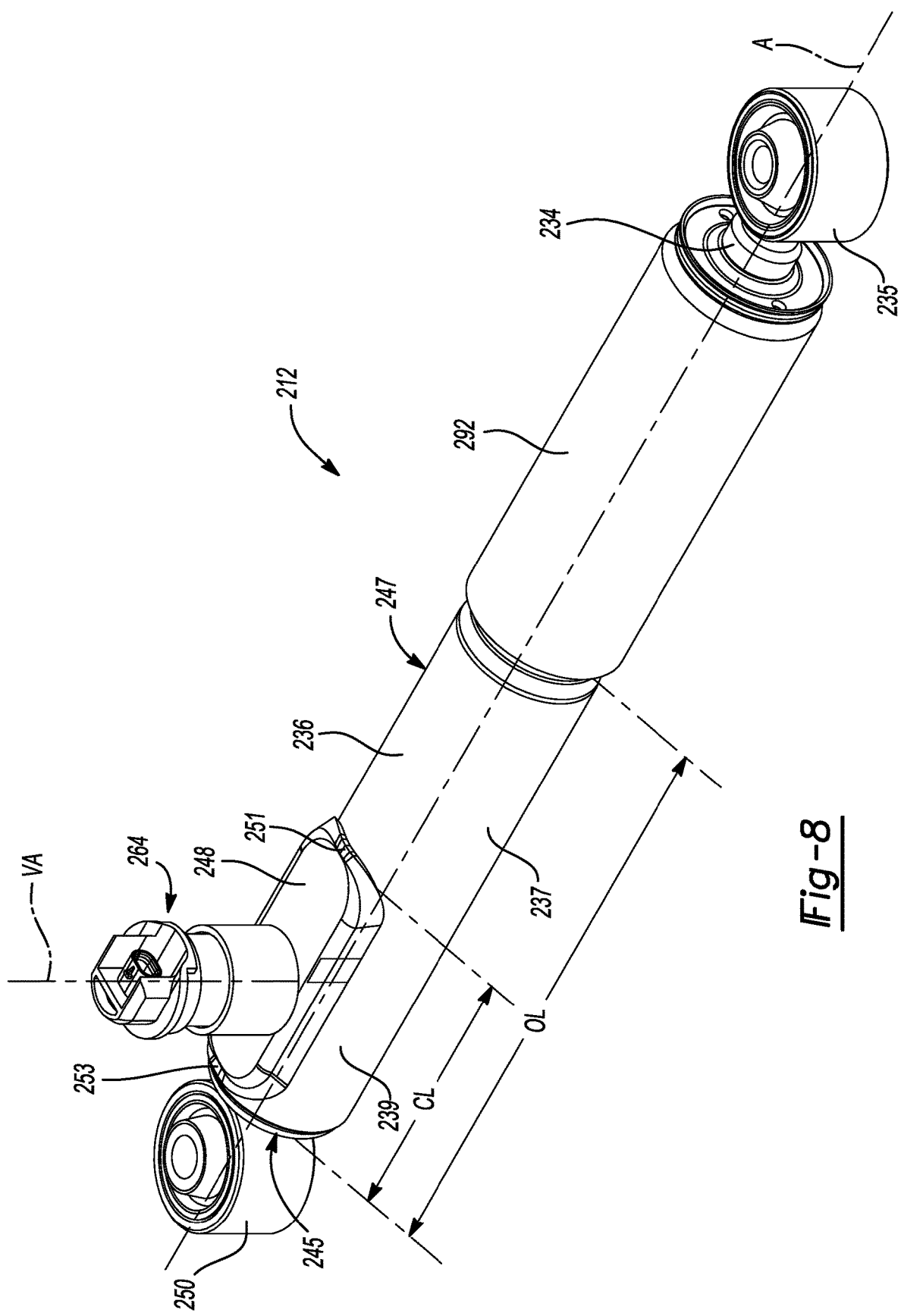
FIG. 8 is a front perspective view of an exemplary dual-tube damper constructed in accordance with the present disclosure.
Figure 9:
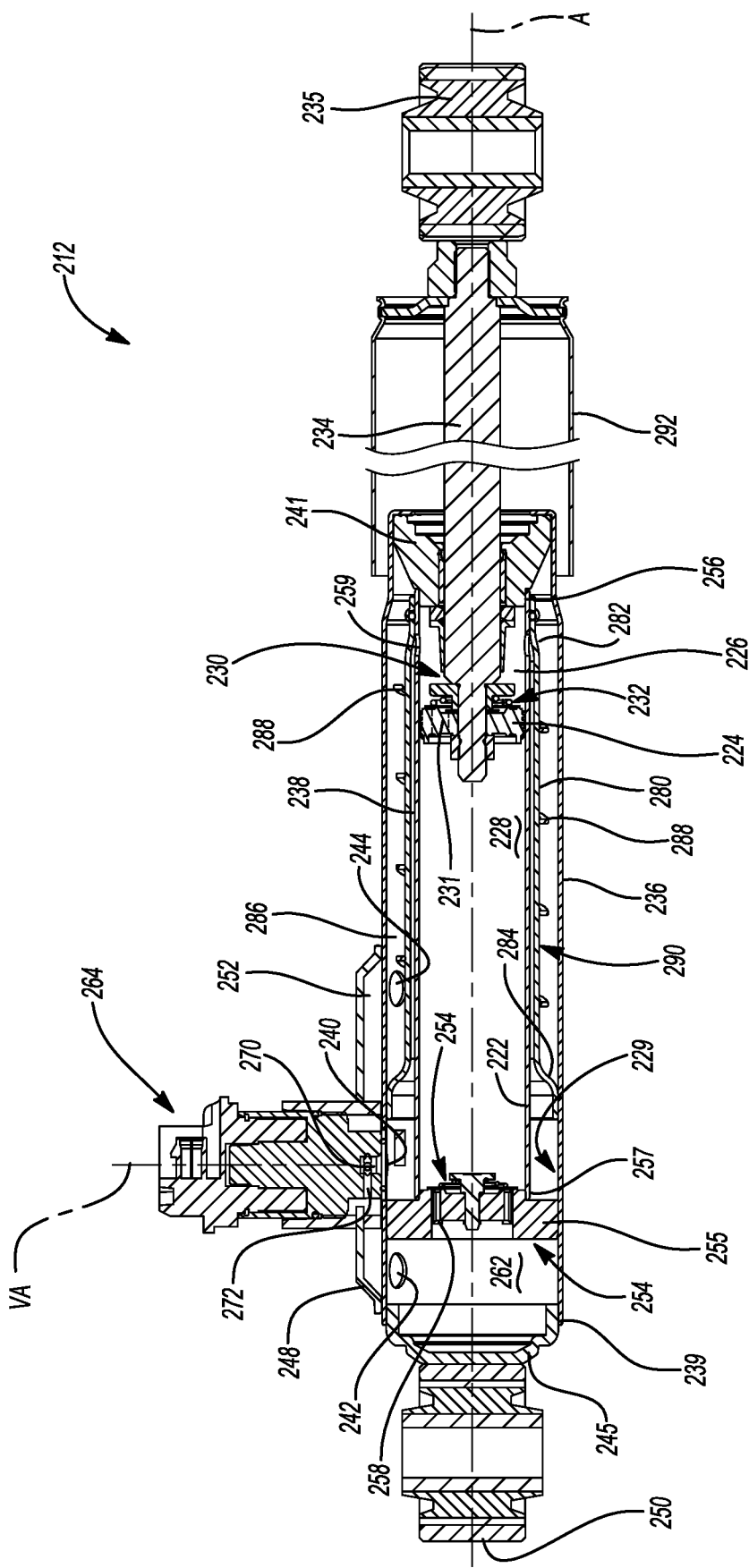
FIG. 9 is a side cross-sectional view of the exemplary damper shown in FIG. 7.

FIGS. 8 and 9 illustrate an exemplary damper 212, which has a dual-tube arrangement. Many of the elements of the damper 212 shown in FIGS. 8 and 9 are the same or substantially the same as the elements of the damper 112 shown in FIGS. 2 and 3, except as noted below. Equivalent elements shared between the embodiments have corresponding reference numbers where reference numerals in the 100s are used in FIGS. 2 and 3 and corresponding reference numerals in the 200s are used in FIGS. 8 and 9.

The damper 212 shown in FIGS. 8 and 9 does not have the floating piston 161 and pressurized chamber 163 like the damper 112 shown in FIGS. 2 and 3. Instead, the damper 212 shown in FIGS. 8 and 9 has an intermediate tube 280 that is disposed radially between the inner tube 222 and the outer tube 236. The intermediate tube 280 extends longitudinally between a first intermediate tube end 282 and a second intermediate tube end 284. The first intermediate tube end 282 abuts an outside cylindrical surface of inner tube 222 near the first inner tube end 256 and the second intermediate tube end 284 abuts an inside cylindrical surface of the outer tube 236 near the collector chamber 252 such that a fluid transport chamber 238 is defined between the inner tube 222 and the intermediate tube 280 and a reserve chamber 286 is defined between the intermediate tube 280 and the outer tube 236. The first working chamber 226 is arranged in fluid communication with the fluid transport chamber 238 via openings 259 in the first inner tube end 256.

The outer tube 236 includes first, second, and third openings 240, 242, 244. The first opening 240 in the outer tube 236 is arranged in fluid communication with and extends between the fluid transport chamber 238 and the inlet 270 of the single control valve 264. The second opening 242 in the outer tube 236 is arranged in fluid communication with and extends between the collector chamber 252 and the accumulation chamber 262. Finally, the third opening 244 in the outer tube 236 is arranged in fluid communication with and extends between the collector chamber 252 and the reserve chamber 286. Optionally, the intermediate tube 280 may include one or more helical ribs 288 that extend helically about an outside surface 290 of the intermediate tube 280. The helical ribs 288 extend radially outwardly from the outside surface 290 of the intermediate tube 280 toward the outer tube 236 and create a tortuous flow path in the reserve chamber 286, which can reduce foaming of the fluid in the reserve chamber 286.

The piston rod 234 includes an attachment interface 235 and the closed portion 245 of the outer tube 236 includes an attachment fitting 261, which are configured to be connected to the body 104 and suspension system 102 of the vehicle 100. Optionally, a guard 292 may be attached to the piston rod 234. The guard 292 extends annularly about and protects the piston rod 234.

The intake valve assembly 254 is mounted to the second inner tube end 257 and includes an intake valve body 255 that abuts the inside cylindrical surface 229 of the outer tube 236 to define the accumulation chamber 262 between the intake valve assembly 254 and the second outer tube end 239. The intake valve body 255 forms a fluid-tight partition between the accumulation chamber 262 and the fluid transport chamber 238. In the illustrated example, the second intermediate tube end 284 is longitudinally spaced from the intake valve assembly 254 and the first opening 240 extends through the outer tube 236 at a location that is longitudinally between the second intermediate tube end 284 and the intake valve body 255.

Figure 12:
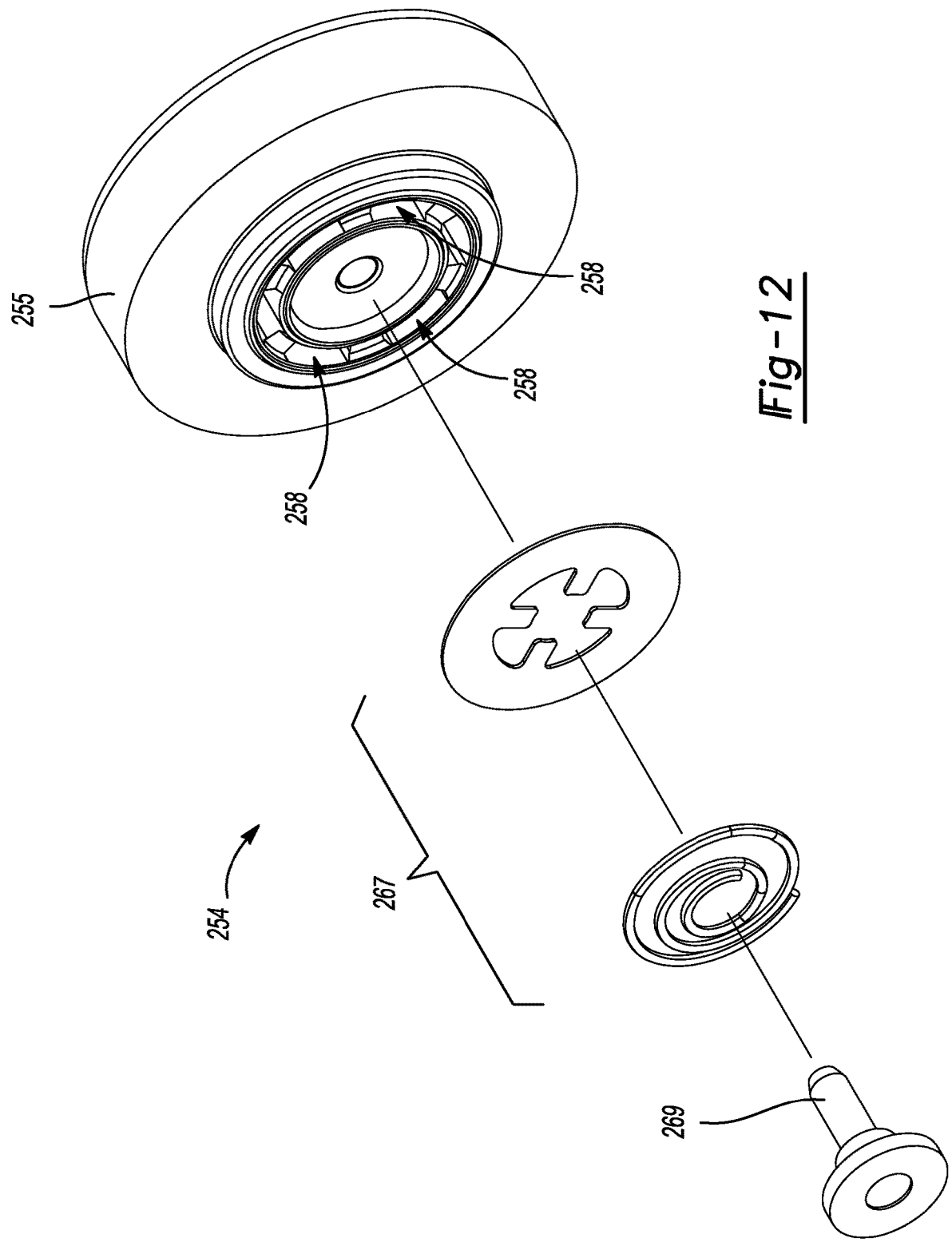
FIG. 12 is a front exploded perspective view of an exemplary intake valve assembly of the exemplary damper shown in FIG. 9.
Figure 13:
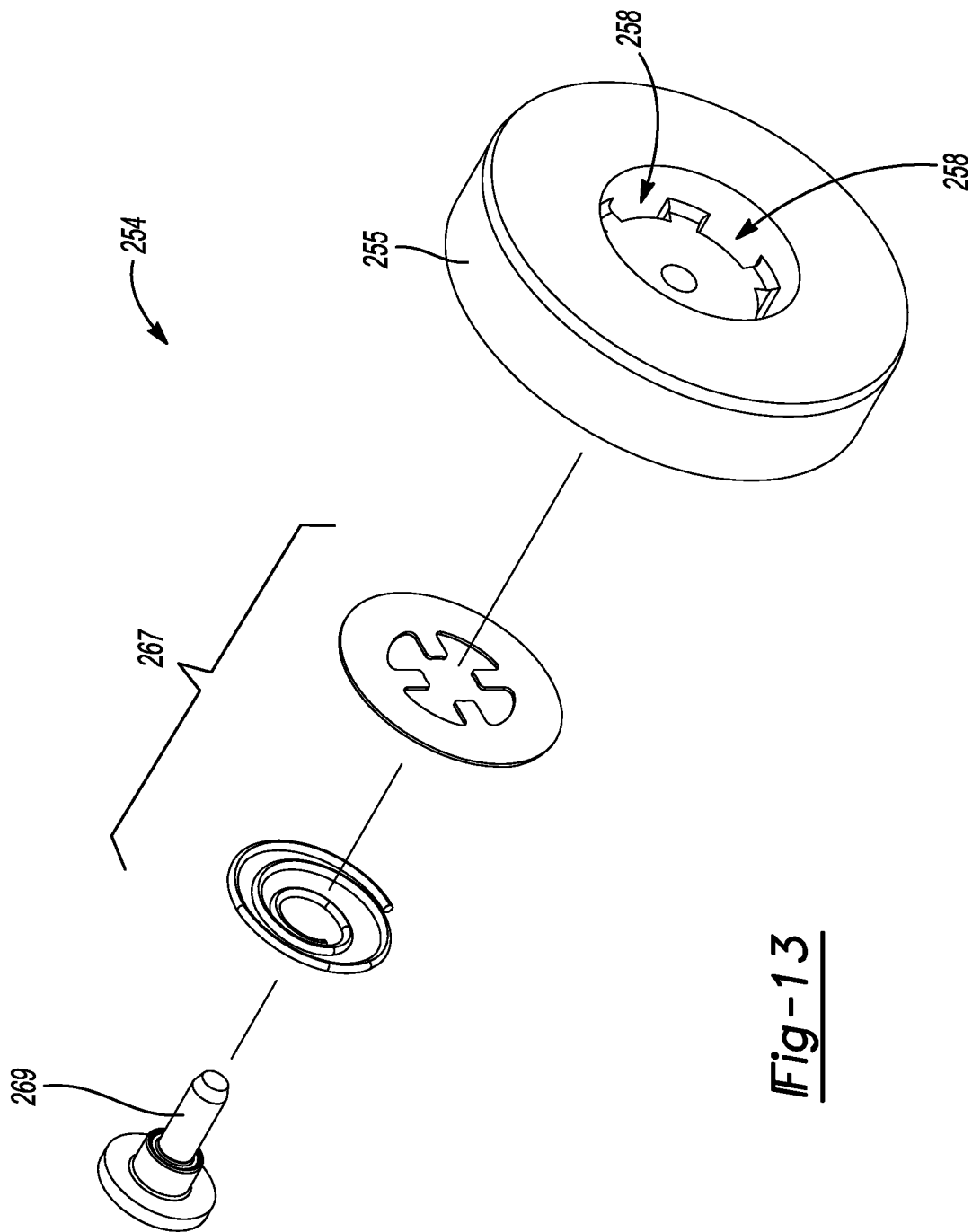
FIG. 13 is a back exploded perspective view of an exemplary intake valve assembly of the exemplary damper shown in FIG. 9.

In accordance with this embodiment, both the accumulation chamber 262 and the reserve chamber 286 are arranged in fluid communication with the collector chamber 252 via the second and third openings 242, 244 in the outer tube 236, respectively. With additional reference to FIGS. 12 and 13, the intake valve assembly 254 includes one or more intake passages 258 in the intake valve body 255 and an intake valve 265. The intake valve 265 includes a spring disc stack 267 that controls fluid flow through the intake passages 258 between the accumulation chamber 262 and the second working chamber 228. Again, the intake valve assembly 254 acts as a one-way valve that permits fluid flow in only one direction from the accumulation chamber 262 to the second working chamber 228 in response to movement of the piston 224 away from the intake valve assembly 254 (i.e., when the piston 224 is moving during an extension/rebound stroke). The piston 224 includes a piston valve assembly 230 comprising one or more compression passages 231 and a compression valve 232. Like the intake valve assembly 254, the piston valve assembly 230 acts as a one-way valve that permits fluid flow through the compression passages 231 in response to movement of the piston 224 toward the intake valve assembly 254. When the compression valve 232 opens during an extension/rebound stroke, fluid flow from the second working chamber 228 to the first working chamber 226 is permitted via the compression passages 231.

Figure 10:
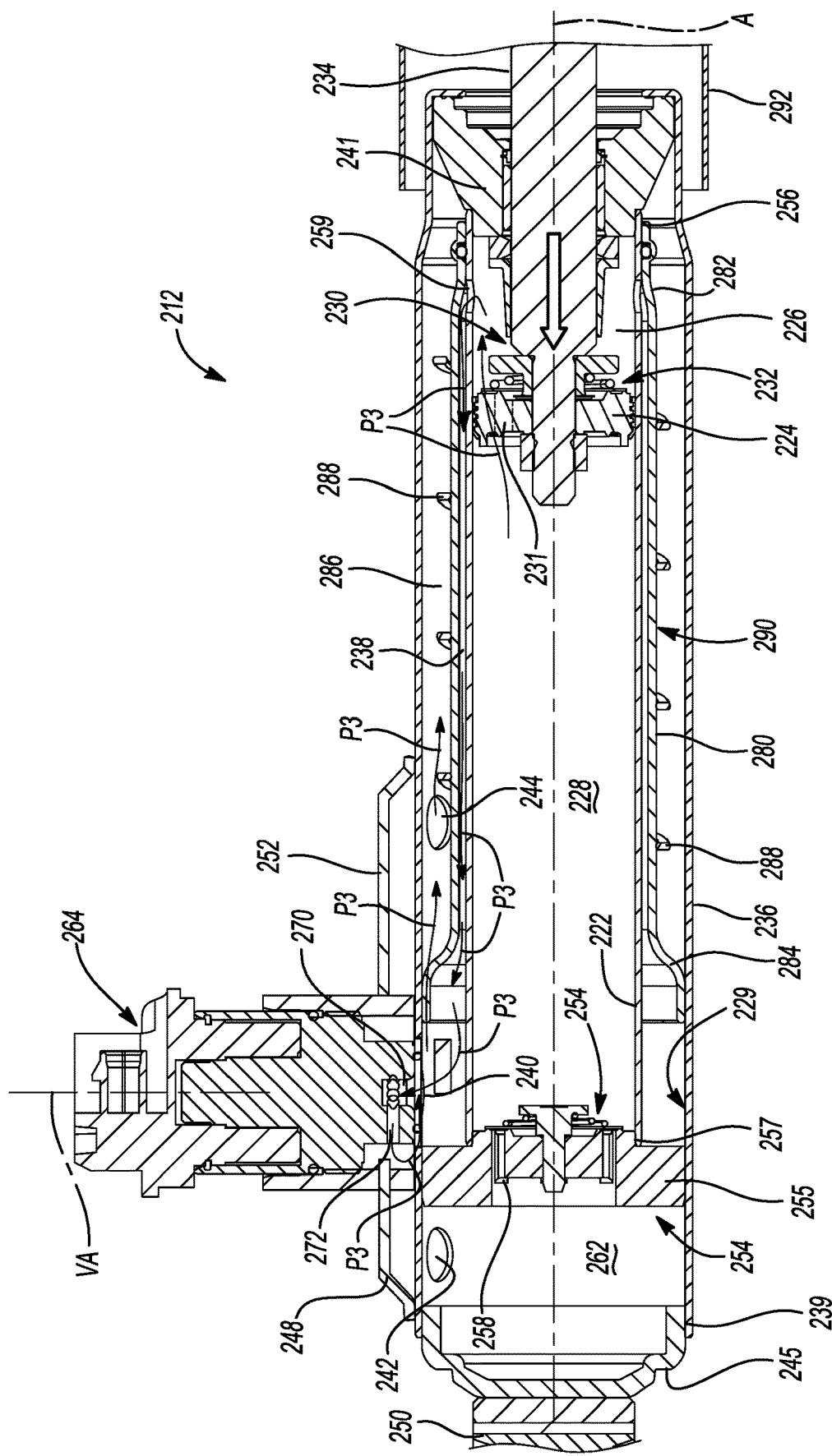
FIG. 10 is an enlarged side cross-sectional view of the exemplary damper shown in FIG. 9, where arrows are included illustrating the fluid flow path through the damper during a compression stroke.

With reference to FIG. 10, the damper 212 is shown in a compression stroke, which occurs when the piston 224 moves towards the intake valve assembly 254. During a compression stroke, a compression flow path P3 is defined within the damper 212 where fluid in the second working chamber 228 flows through the piston valve assembly 230 and into the first working chamber 226. Fluid in the first working chamber 226 is displaced by the increase in rod volume and flows into the fluid transport chamber 238 via the openings 259 in the first inner tube end 256. The fluid in the fluid transport chamber 238 flows to the inlet 270 of the single control valve 264 and passes through the first opening 240 in the outer tube 236. Fluid from the inlet 270 of the single control valve 264 flows to the outlet 272 of the single control valve 264 because the single control valve 264 is in the open position. Fluid from the outlet 272 of the single control valve 264 flows into the collector chamber 252. Finally, fluid from the collector chamber 252 flows into the reserve chamber 286 via the third opening 244 in the outer tube 236.

Figure 11:
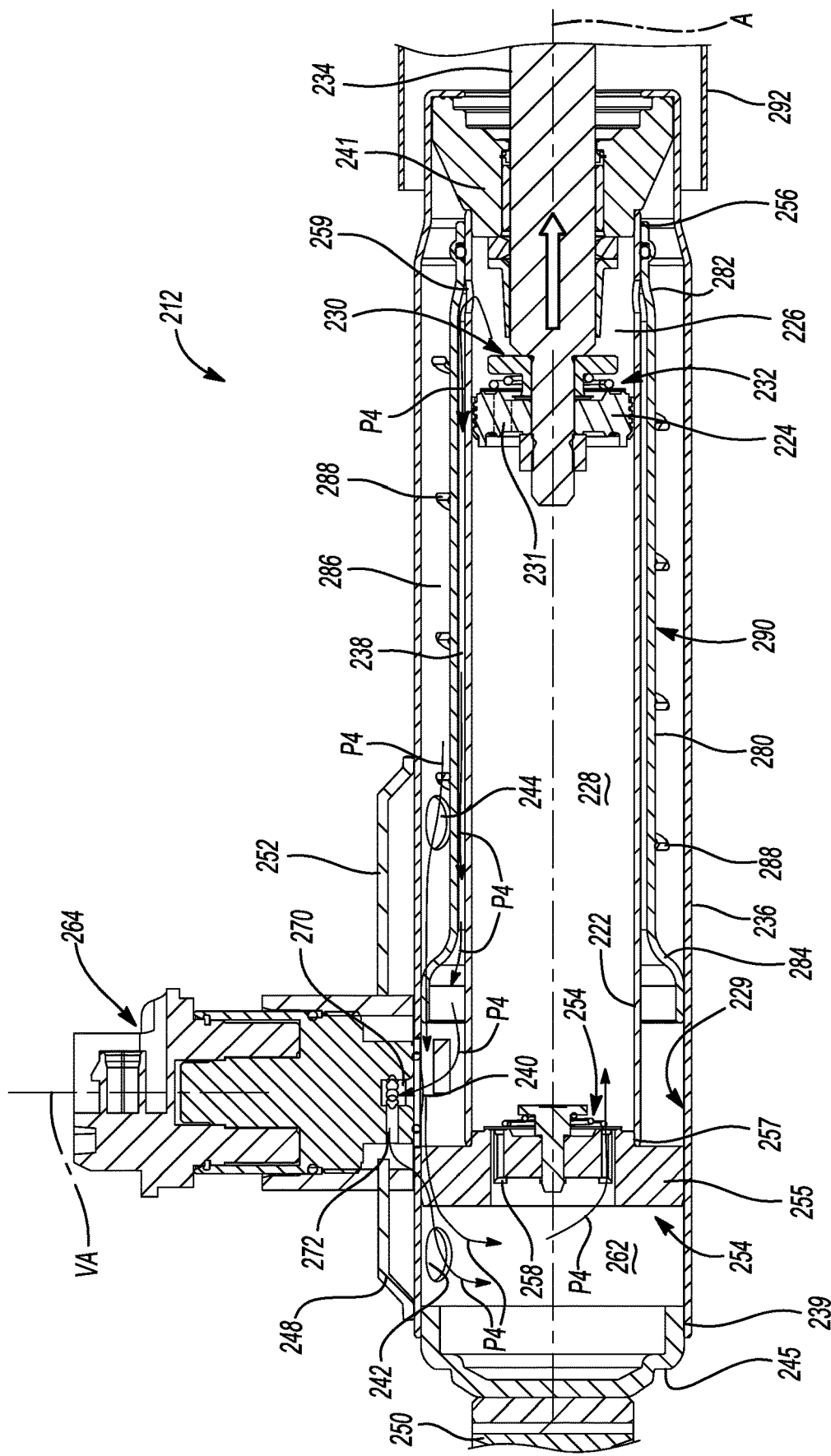
FIG. 11 is another enlarged side cross-sectional view of the exemplary damper shown in FIG. 10, where arrows are included illustrating the fluid flow path through the damper during an extension stroke.

With reference to FIG. 11, the damper 212 is shown in an extension/rebound stroke, which occurs when the piston 224 moves away from the intake valve assembly 254. During the extension/rebound stroke, an extension flow path P4 is defined inside the damper 212 where fluid in the first working chamber 226 flows into the fluid transport chamber 238 via the openings 259 in the first inner tube end 256. Fluid in the fluid transport chamber 238 flows to the inlet 270 of the single control valve 264 and passes through the first opening 240 in the outer tube 236. Fluid from the inlet 270 of the single control valve 264 flows to the outlet 272 of the single control valve 264 because the single control valve 264 is in the open position and fluid from the outlet 272 of the single control valve flows 264 into the collector chamber 252. In addition, fluid from the reserve chamber 286 flows into the collector chamber 252 via the third opening 244 in the outer tube 236. The fluid in the collector chamber 252 then flows into the accumulation chamber 262 via the second opening 242 in the outer tube 236. Finally, fluid from the accumulation chamber 262 flows through the intake valve assembly 254 and into the second working chamber 228, which increases in volume during extension/rebound strokes.

As explained above, the degree and speed in which the single control valves 164, 264 opens during compression and extension/rebound strokes can be controlled by the electronic controller 120 to control or change the damping level and therefore compression and extension/rebound damping curves of the dampers 112, 212. The damper 212 illustrated in FIGS. 8-13 could alternatively be modified to include a floating piston accumulator arrangement much like the accumulator 160 and floating piston 161 shown in FIGS. 3-5. The combination of the dual-tube arrangement of the damper 212 with a floating piston accumulator provides additional packaging flexibility and can help reduce the overall length of the damper 212.

While aspects of the present disclosure have been particularly shown and described with reference to the embodiments above, it will be understood by those skilled in the art that various additional embodiments may be contemplated by the modification of the disclosed dampers without departing from the spirit and scope of what is disclosed. Such embodiments should be understood to fall within the scope of the present disclosure as determined based upon the claims and any equivalents thereof.

What is claimed is:

1. A damper comprising:
   an inner tube extending longitudinally between a first inner tube end and a second inner tube end;
   a piston slidably disposed within the inner tube defining a first working chamber and a second working chamber;
   an outer tube disposed around the inner tube, the first working chamber arranged in direct fluid communication with a fluid transport chamber disposed between the inner tube and the outer tube;
   a collector chamber positioned outside of the outer tube;
   a single control valve externally mounted to the outer tube, the single control valve having a control valve inlet that is arranged in fluid communication with the fluid transport chamber between the inner and outer tubes and a control valve outlet that is arranged in fluid communication with the collector chamber; and
   an intake valve assembly positioned at the second inner tube end and within the outer tube to define an accumulation chamber arranged in fluid communication with the collector chamber, an entirety of the accumulation chamber being longitudinally positioned on an opposite side of the intake valve assembly as the inner tube, the intake valve assembly forming a fluid-tight partition between the accumulation chamber and the fluid transport chamber, and the intake valve assembly including at least one intake valve that controls fluid flow through the intake valve assembly between the accumulation chamber and the second working chamber.

2. The damper of claim 1, further comprising:
   a piston rod, connected to the piston, that extends longitudinally through a rod guide housed inside the outer tube.

3. The damper of claim 2, wherein the piston rod extends along a longitudinal axis and the single control valve includes a valve member that is moveable along a control valve axis between an open position and a closed position and wherein the control valve axis is perpendicular to the longitudinal axis of the piston rod.

4. The damper of claim 2, wherein the rod guide includes a rod guide passage arranged in fluid communication with and extending between the first working chamber and the fluid transport chamber.

5. The damper of claim 1, wherein the outer tube includes a closed portion and a cylindrical portion and wherein the intake valve assembly include an intake valve body that abuts an inside cylindrical surface of the cylindrical portion of the outer tube.

6. The damper of claim 5, further comprising:
   an attachment fitting mounted to the closed portion of the outer tube.

7. The damper of claim 1, wherein the collector chamber has a limited circumferential extent that extends about the outer tube in an arc that is less than or equal to 180 degrees.

8. The damper of claim 1, wherein the outer tube has an outer tube length that is measured longitudinally between first and second outer tube ends, wherein the collector chamber has a collector chamber length that is measured longitudinally between first and second collector ends, and wherein the collector chamber length is shorter than the outer tube length.

9. The damper of claim 1, wherein the single control valve is operable to regulate fluid flow from the fluid transport chamber to the collector chamber.

10. A damper comprising:
    an inner tube extending longitudinally between a first inner tube end and a second inner tube end;
    a piston slidably disposed within the inner tube;
    a first working chamber defined within the inner tube between the piston and the first inner tube end;
    a second working chamber defined within the inner tube between the piston and the second inner tube end;
    an outer tube disposed around the inner tube, the outer tube extending longitudinally between a first outer tube end and a second outer tube end, the first outer tube end being proximate the first inner tube end, the first working chamber arranged in direct fluid communication with a fluid transport chamber disposed between the inner tube and the outer tube;
    a collector chamber positioned outside of the outer tube;
    a single control valve externally mounted to the outer tube, the single control valve having a control valve inlet that is arranged in fluid communication with the fluid transport chamber between the inner and outer tubes and a control valve outlet that is arranged in fluid communication with the collector chamber;

an intake valve assembly mounted to the second inner tube end, the intake valve assembly including an intake valve body that abuts the outer tube to define an accumulation chamber disposed between the intake valve assembly and the second outer tube end, the accumulation chamber arranged in fluid communication with the collector chamber and the intake valve body forming a fluid-tight partition between the accumulation chamber and the fluid transport chamber disposed between the inner tube and the outer tube, the intake valve assembly including at least one intake passage extending through the intake valve body and an intake valve that controls fluid flow through the at least one intake passage between the accumulation chamber and the second working chamber;

a floating piston slidably disposed in the outer tube between the intake valve assembly and the second outer tube end, wherein the accumulation chamber is positioned longitudinally between the intake valve assembly and the floating piston; and a pressurized chamber positioned longitudinally between the floating piston and the second outer tube end, the pressurized chamber containing a pressurized fluid that operates to bias the floating piston towards the intake valve assembly.

11. The damper of claim 10, wherein the intake valve assembly is a one-way valve that permits fluid flow in only one direction from the accumulation chamber to the second working chamber in response to movement of the piston away from the intake valve assembly, wherein the piston includes a piston valve assembly comprising at least one compression passage and a compression valve, and wherein the piston valve assembly is a one-way valve that permits fluid flow through the at least one compression passage from the second working chamber to the first working in response to movement of the piston toward the intake valve assembly.

12. The damper of claim 11, wherein the outer tube includes a first opening arranged in fluid communication with and extending between the fluid transport chamber and the inlet of the control valve and wherein the outer tube includes a second opening arranged in fluid communication with and extending between the collector chamber and the accumulation chamber.

13. The damper of claim 12, wherein a compression flow path is defined when the single control valve is in an open position and the piston moves toward the intake valve assembly where fluid in the second working chamber flows through the piston valve assembly to the first working chamber, fluid from the first working chamber flows to the fluid transport chamber, fluid from the fluid transport chamber flows to the inlet of the single control valve via the first opening in the outer tube, fluid from the inlet of the single control valve flows to the outlet of the single control valve, fluid from the outlet of the single control valve flows to the collector chamber, and fluid from the collector chamber flows to the accumulation chamber via the second opening in the outer tube.

14. The damper of claim 12, wherein an extension flow path is defined when the single control valve is in an open position and the piston moves away from the intake valve assembly where fluid in the first working chamber flows to the fluid transport chamber, fluid from the fluid transport chamber flows to the inlet of the single control valve via the first opening in the outer tube, fluid from the inlet of the single control valve flows to the outlet of the single control valve, fluid from the outlet of the single control valve flows to the collector chamber, fluid from the collector chamber flows to the accumulation chamber via the second opening in the outer tube, and fluid from the accumulation chamber flows through the intake valve assembly to the second working chamber.

15. A damper comprising:
an inner tube extending longitudinally between a first inner tube end and a second inner tube end;
a piston slidably disposed within the inner tube;
a first working chamber defined within the inner tube between the piston and the first inner tube end;
a second working chamber defined within the inner tube between the piston and the second inner tube end;
an outer tube disposed around the inner tube, the outer tube extending longitudinally between a first outer tube end and a second outer tube end;
an intermediate tube disposed radially between the inner tube and the outer tube, the intermediate tube extending longitudinally between a first intermediate tube end that abuts the first inner tube end and a second intermediate tube end that abuts an inside cylindrical surface of the outer tube such that a reserve chamber is defined between the intermediate tube and the outer tube and such that the first working chamber is arranged in fluid communication with a fluid transport chamber disposed between the intermediate tube and the inner tube;
a collector chamber positioned outside of the outer tube;
a single control valve externally mounted to the outer tube, the single control valve having a control valve inlet that is arranged in fluid communication with the fluid transport chamber between the inner and outer tubes and a control valve outlet that is arranged in fluid communication with the collector chamber; and
an intake valve assembly mounted to the second inner tube end, the intake valve assembly including an intake valve body that abuts the outer tube to define an accumulation chamber disposed between the intake valve assembly and the second outer tube end, the accumulation chamber and the reserve chamber arranged in fluid communication with the collector chamber, the intake valve body forming a fluid-tight partition between the accumulation chamber and the fluid transport chamber, the intake valve assembly including at least one intake passage extending through the intake valve body and an intake valve that controls fluid flow through the at least one intake passage between the accumulation chamber and the second working chamber.

16. The damper of claim 15, wherein the intake valve assembly is a one-way valve that permits fluid flow in only one direction from the accumulation chamber to the second working chamber in response to movement of the piston away from the intake valve assembly, wherein the piston includes a piston valve assembly comprising at least one compression passage and a compression valve, and wherein the piston valve assembly is a one-way valve that permits fluid flow through the at least one compression passage from the second working chamber to the first working chamber in response to movement of the piston toward the intake valve assembly.

17. The damper of claim 16, wherein the outer tube includes a first opening arranged in fluid communication with and extending between the fluid transport chamber and the inlet of the single control valve, wherein the outer tube includes a second opening arranged in fluid communication with and extending between the collector chamber and the accumulation chamber, and wherein the outer tube includes a third opening arranged in fluid communication with and extending between the collector chamber and the reserve chamber.

18. The damper of claim 17, wherein a compression flow path is defined when the single control valve is in an open position and the piston moves toward the intake valve assembly where fluid in the second working chamber flows through the piston valve assembly to the first working chamber, fluid from the first working chamber flows to the fluid transport chamber, fluid from the fluid transport chamber flows to the inlet of the single control valve via the first opening in the outer tube, fluid from the inlet of the single control valve flows to the outlet of the single control valve, fluid from the outlet of the single control valve flows to the collector chamber, and fluid from the collector chamber flows to the reserve chamber via the third opening in the outer tube.

19. The damper of claim 17, wherein an extension flow path is defined when the single control valve is in an open position and the piston moves away from the intake valve assembly where fluid in the first working chamber flows to the fluid transport chamber, fluid from the fluid transport chamber flows to the inlet of the single control valve via the first opening in the outer tube, fluid from the inlet of the single control valve flows to the outlet of the single control valve, fluid from the outlet of the single control valve flows to the collector chamber, fluid from the reserve chamber flows to the collector chamber via the third opening in the outer tube, fluid from the collector chamber flows to the accumulation chamber via the second opening in the outer tube, and fluid from the accumulation chamber flows through the intake valve assembly to the second working chamber.

20. The damper of claim 15, wherein the intermediate tube includes at least one helical rib that extends helically about an outside surface of the intermediate tube and outwardly towards the outer tube.

* * * * *